(12) United States Patent
Seubert et al.

(10) Patent No.: US 10,792,693 B2
(45) Date of Patent: Oct. 6, 2020

(54) ULTRASONIC APPLICATORS WITH UV LIGHT SOURCES AND METHODS OF USE THEREOF

(71) Applicant: Ford Motor Company, Dearborn, MI (US)

(72) Inventors: Christopher Michael Seubert, New Hudson, MI (US); Mark Edward Nichols, Saline, MI (US); Kevin Richard John Ellwood, Ann Arbor, MI (US); Wanjiao Liu, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 16/211,547

(22) Filed: Dec. 6, 2018

(65) Prior Publication Data

US 2019/0232317 A1   Aug. 1, 2019

Related U.S. Application Data

(60) Provisional application No. 62/624,013, filed on Jan. 30, 2018.

(51) Int. Cl.
*B05D 1/02* (2006.01)
*B05D 3/06* (2006.01)
(Continued)

(52) U.S. Cl.
CPC .......... *B05B 17/0646* (2013.01); *B05B 1/262* (2013.01); *B05B 3/02* (2013.01);
(Continued)

(58) Field of Classification Search
CPC ... B05B 17/0646; B05B 17/06; B05B 17/063; B05B 17/0653; B05B 17/0669;
(Continued)

(56) References Cited

U.S. PATENT DOCUMENTS

| 4,038,570 A | 7/1977 | Durley, III |
| 5,387,444 A | 2/1995 | Bachmann |

(Continued)

FOREIGN PATENT DOCUMENTS

| CN | 103736620 | 4/2014 |
| CN | 104689946 | 6/2015 |

(Continued)

OTHER PUBLICATIONS

Hielscher—Ultrasound Technology, Ultrasonic Spraying, Nebulizing, and Atomizing, Sep. 17, 2018.
(Continued)

*Primary Examiner* — Michael P Wieczorek
(74) *Attorney, Agent, or Firm* — Burris Law, PLLC

(57) ABSTRACT

A method of controlling application of material onto a substrate is provided. The method includes ejecting an ultraviolet (UV) curable material through a plurality of micro-applicators in the form of atomized droplets. At least one UV light source is positioned adjacent to the plurality of micro-applicators and the atomized droplets are irradiated with UV light by the at least one UV light source and curing of the atomized droplets is initiated. The atomized droplets are deposited onto a surface of the substrate and a UV cured coating on the surface is formed thereon. The UV curable material may include a photolatent base catalyst such that the atomized droplets deposited onto the surface continue to cure after being irradiated with the at least one UV light source. The at least one UV light source can include a UV light ring, a UV light emitting diode, and the like.

17 Claims, 3 Drawing Sheets

Figure 1:
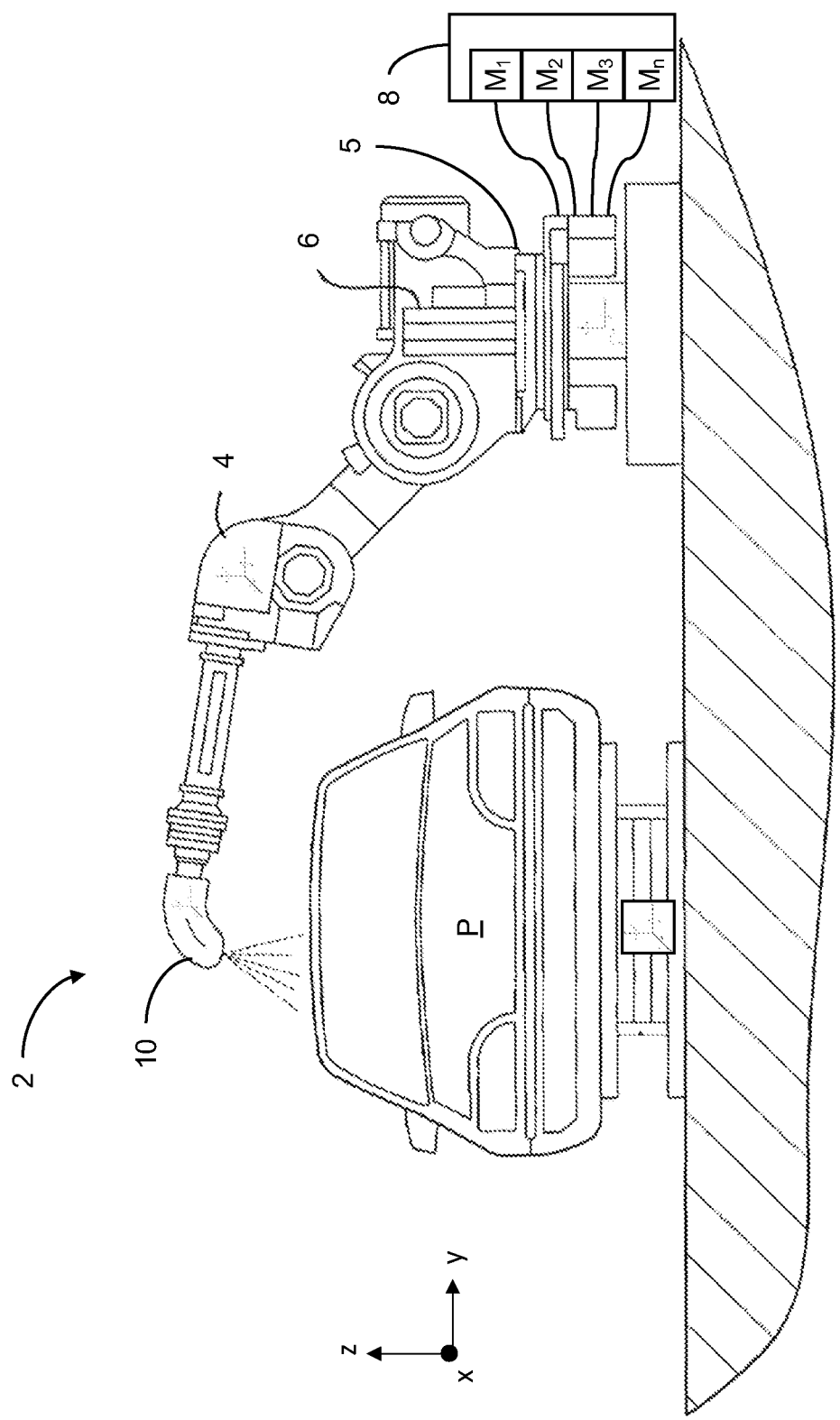

(51) Int. Cl.

| | | |
|---|---|---|
| *B05B 17/00* | (2006.01) | |
| *B05B 17/06* | (2006.01) | |
| *B05B 13/04* | (2006.01) | |
| *B05B 3/14* | (2006.01) | |
| *B05B 3/02* | (2006.01) | |
| *B05B 15/628* | (2018.01) | |
| *B05B 12/36* | (2018.01) | |
| *B05B 15/625* | (2018.01) | |
| *B05B 12/16* | (2018.01) | |
| *B05B 7/14* | (2006.01) | |
| *B25J 11/00* | (2006.01) | |
| *B05B 12/00* | (2018.01) | |
| *B05B 15/68* | (2018.01) | |
| *B05B 1/26* | (2006.01) | |
| *B05B 15/00* | (2018.01) | |
| *B05D 1/12* | (2006.01) | |

(52) U.S. Cl.
CPC .............. *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02); *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(58) Field of Classification Search
CPC ..... B05B 15/628; B05B 15/68; B05B 15/625; B05B 12/16; B05B 12/36; B05B 13/0431; B05B 13/0452; B05B 7/228; B29C 35/0805; B29C 2035/0827; B05D 1/02; B05D 1/12; B05D 3/067
See application file for complete search history.

(56) References Cited

U.S. PATENT DOCUMENTS

| | | | |
|---|---|---|---|
| 5,516,043 A | | 5/1996 | Manna et al. |
| 5,540,384 A | | 7/1996 | Erickson et al. |
| 5,624,075 A | | 4/1997 | Dankert |
| 5,636,798 A | | 6/1997 | Buschor |
| 5,669,971 A | | 9/1997 | Bok et al. |
| 5,823,428 A | | 10/1998 | Humberstone et al. |
| 6,349,668 B1 * | 2/2002 | Sun | ........................... B05B 5/00 118/723 E |
| 6,394,363 B1 | | 5/2002 | Arnott et al. |
| 6,666,835 B2 | | 12/2003 | Martin et al. |
| 6,755,985 B2 | | 6/2004 | Fiala et al. |
| 7,168,633 B2 | | 1/2007 | Wang et al. |
| 7,350,890 B2 | | 4/2008 | Baird et al. |
| 7,550,897 B2 | | 6/2009 | Hailes |
| 7,704,564 B2 | | 4/2010 | DeRegge et al. |
| 7,934,665 B2 | | 5/2011 | Erickson et al. |
| 7,976,135 B2 | | 7/2011 | Brown et al. |
| 7,977,849 B2 | | 7/2011 | Hailes et al. |
| 8,191,982 B2 | | 6/2012 | Brown et al. |
| 8,317,299 B2 | | 11/2012 | Brown |
| 8,440,014 B2 | | 5/2013 | Kitamura et al. |
| 8,524,330 B2 | | 9/2013 | Fan et al. |
| 8,821,802 B2 | | 9/2014 | Haran |
| 9,149,750 B2 | | 10/2015 | Steele et al. |
| 9,156,049 B2 | | 10/2015 | Galluzzo et al. |
| 9,452,442 B2 | | 9/2016 | Selby et al. |
| 9,592,524 B2 | | 3/2017 | Fritz et al. |
| 2006/0005766 A1 | | 1/2006 | Gorges et al. |
| 2006/0108450 A1* | 5/2006 | Klinkenberg | ........... B05B 7/228 239/525 |
| 2007/0102537 A1 | | 5/2007 | Stauch et al. |
| 2009/0092764 A1* | 4/2009 | Hoeckelman | ........... B05B 7/228 427/508 |
| 2010/0183820 A1 | | 7/2010 | Seubert et al. |
| 2010/0285234 A1 | | 11/2010 | Van Den Berg et al. |
| 2014/0110500 A1 | | 4/2014 | Crichton et al. |
| 2016/0059262 A1 | | 3/2016 | Seyler |
| 2016/0158789 A1 | | 6/2016 | Selby et al. |
| 2016/0228902 A1 | | 8/2016 | Crichton |

FOREIGN PATENT DOCUMENTS

| | | |
|---|---|---|
| CN | 104841592 | 8/2015 |
| DE | 19631811 | 2/1998 |
| DE | 20023848 | 12/2006 |
| DE | 102011088373 | 6/2013 |
| DE | 102013205171 | 9/2014 |
| EP | 1884365 | 2/2008 |
| GB | 2215240 | 9/1989 |
| JP | H10538809 | 2/1993 |
| JP | H108215616 | 8/1996 |
| JP | 2003091010 | 3/2003 |
| KR | 20180080977 | 7/2018 |
| WO | 2018108572 | 6/2018 |
| WO | 2018162872 | 9/2018 |

OTHER PUBLICATIONS

Ransburg, Evolver 303 Dual Purge Solventbome Robotic Atomizers, Model: A12374-XXX, Service Manual AA-08-01.5, May 2015.
Regan, Michael, UV Coatings: Curing at Light-Speed, BodyShop Business, May 1, 2005.

* cited by examiner

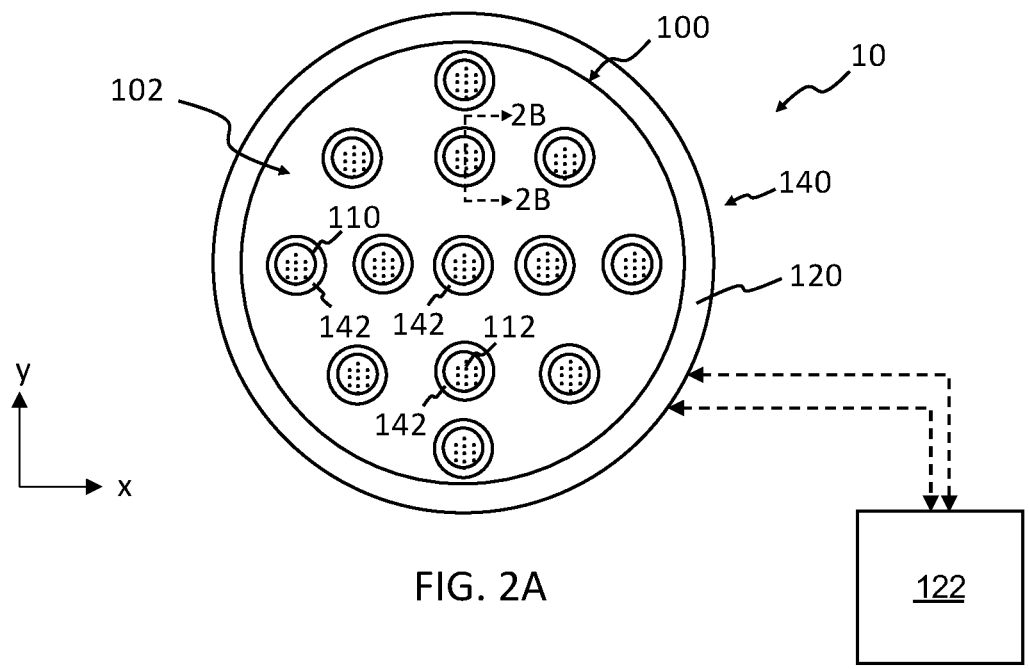
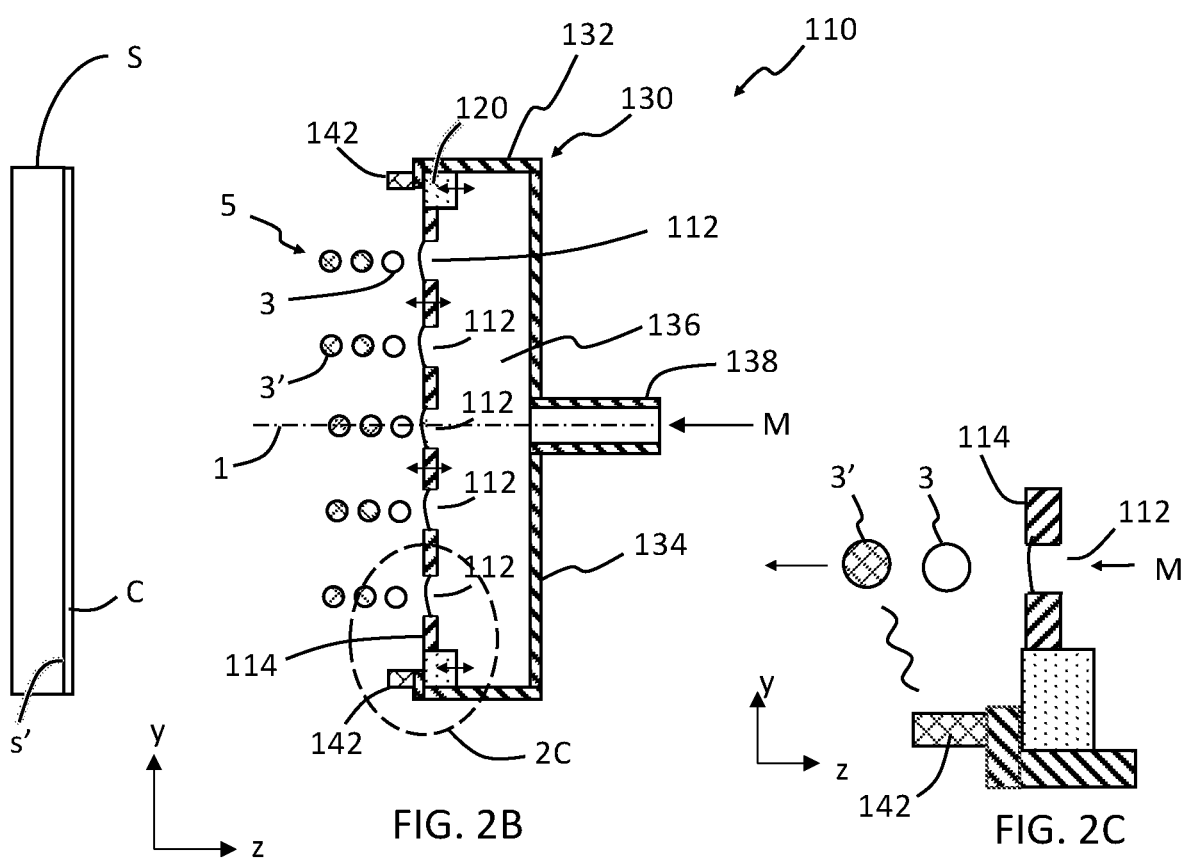

ULTRASONIC APPLICATORS WITH UV LIGHT SOURCES AND METHODS OF USE THEREOF

CROSS-REFERENCE TO RELATED APPLICATIONS

This application claims priority to provisional application 62/624,013 filed on Jan. 30, 2018. The disclosures of the above applications are incorporated herein by reference.

FIELD

The present disclosure relates to the painting of vehicles, and more particularly to methods and equipment used in high volume production to paint the vehicles and components thereof.

BACKGROUND

The statements in this section merely provide background information related to the present disclosure and may not constitute prior art.

Painting automotive vehicles in a high volume production environment involves substantial capital cost, not only for application and control of the paint, but also for equipment to capture overspray. The overspray can be up to 40% of the paint that exits an applicator, or in other words, to 40% of the paint that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200K CFM) that flows through the paint booths must be conditioned, the flow of water must be maintained, compressed air must be supplied, and complex electrostatics are employed to improve transfer efficiency.

Moreover, ultraviolet (UV) curable coatings are ubiquitously used in various industries. Applications of UV curable coatings range from flooring to fiber optic cables and beyond. UV curable coatings are currently used in the vehicle industry on polycarbonate headlamps. However, UV curable coatings have the potential to be used on the vehicle exterior if a durable and robust material system can be formulated. An additional challenge to using UV curable coatings on the exterior of vehicles is the difficulty of delivering sufficient UV light to cure the coating to all regions, particularly regions that are "shadowed" from that light.

This issue of UV curable coatings, among other issues related to the painting of automotive vehicles or other objects in a high volume production environment, are addressed by the present disclosure.

SUMMARY

In one form of the present disclosure, a method of controlling application of material onto a substrate includes ejecting at least one material (also referred to herein as "material(s)") through at least one array comprising a plurality of micro-applicators. At least one ultraviolet (UV) light source is positioned adjacent to the at least one array such that the material(s) moves past and is irradiated by the at least one UV light source. In some aspects of the present disclosure, the material(s) is ejected from each of the plurality of micro-applicators and is irradiated by the at least one UV light source. The at least one UV light source includes a UV light ring. In the alternative, or in addition to, the at least one UV light source includes a UV light emitting diode (LED). Also, the at least one UV light source may comprise a plurality of UV light rings positioned adjacent to the plurality of micro-applicators such that each UV light ring is positioned adjacent to a micro-applicator and the material(s) ejected from a given micro-applicator is irradiated by the UV light ring positioned adjacent to the given micro-applicator. In the alternative, or in addition to, the at least one UV light source may comprise a plurality of UV LEDs positioned adjacent to the plurality of micro-applicators such that each UV LED is positioned adjacent to a micro-applicator and the material(s) ejected from a given micro-applicator is irradiated by the UV LED positioned adjacent to the given micro-applicator.

The at least one material(s) is a UV curable coating material. In some aspects of the present disclosure, the UV curable coating material includes a curing catalyst that is activated with UV light. For example, the curing catalyst may be a photolatent base catalyst.

In some aspects of the present disclosure, an ultrasonic transducer is mechanically coupled to the at least one array and the material(s) is ejected as atomized droplets. In such aspects the material(s) ejected through the at least one array with the plurality of micro-applicators and the least one UV light source is used to paint a vehicle with a UV curable clear coat material.

In another form of the present disclosure, a method of controlling application of coating material onto a vehicle includes flowing material(s) through an ultrasonic atomization material applicator with at least one array comprising a plurality of micro-applicators and a plurality of UV light sources positioned adjacent the plurality of micro-applicators. The material(s) is ejected from the plurality of micro-applicators thereby forming atomized droplets and the atomized droplets are irradiated with UV light from the plurality of UV light sources. In some aspects of the present disclosure, the plurality of UV light sources comprises a plurality of UV light rings, a plurality of UV light emitting diodes, or a combination thereof.

In still another form of the present disclosure, an ultrasonic atomization material applicator is provided. The ultrasonic atomization material applicator includes a nozzle comprising an array plate and an ultrasonic transducer mechanically coupled to the array plate. The array plate has a plurality of micro-applicators and the nozzle is configured to eject material(s) from the plurality of micro-applicators in the form of atomized droplets. A plurality of UV light sources are positioned adjacent the plurality of micro-applicators and the plurality of UV light sources is configured to irradiate atomized droplets ejected from the plurality of micro-applicators.

In some aspects of the present disclosure, the plurality of UV light sources comprises a plurality of UV light rings positioned adjacent to the plurality of micro-applicators such that each UV light ring is positioned adjacent to a micro-applicator and the material(s) ejected from a given micro-applicator is irradiated by the UV light ring positioned adjacent to the given micro-applicator. In the alternative, or in addition to, the plurality of UV light sources comprises a plurality of UV LEDs positioned adjacent to the plurality of micro-applicators such that each UV LED is positioned adjacent to a micro-applicator and the material(s) ejected from a given micro-applicator is irradiated by a UV LED positioned adjacent to the given micro-applicator.

Further areas of applicability will become apparent from the description provided herein. It should be understood that the description and specific examples are intended for purposes of illustration only and are not intended to limit the scope of the present disclosure.

DRAWINGS

Figure 3:
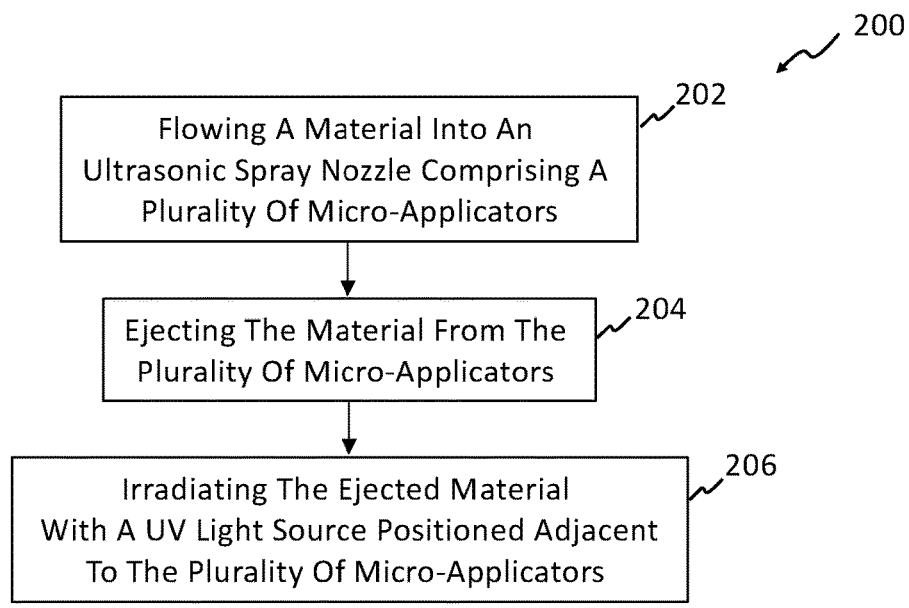
Figure 4:
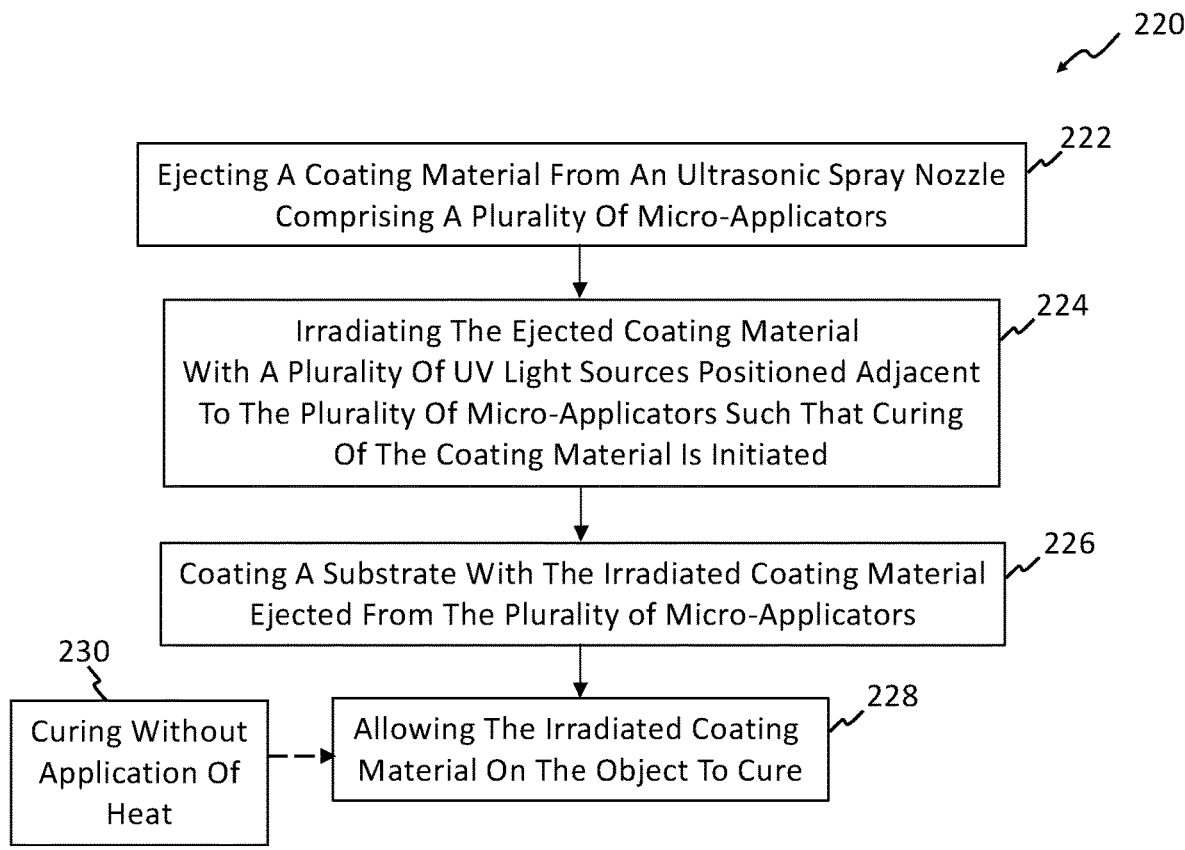

In order that the disclosure may be well understood, there will now be described various forms thereof, given by way of example, reference being made to the accompanying drawings, in which:

FIG. 1 is a planar view of an exemplary paint spray system according to the teachings of the present disclosure;

FIG. 2A schematically depicts a planar view of an exemplary array of micro-applicators according to the teachings of the present disclosure;

FIG. 2B schematically depicts a side cross-sectional view of section 2B-2B in FIG. 2A;

FIG. 2C is a magnified view of section 2C in FIG. 2B;

FIG. 3 a flow diagram illustrating a method of controlling application of material onto a substrate according to the teachings of the present disclosure; and FIG. 4 is another flow diagram illustrating a method of controlling application of material onto a substrate according to the teachings of the present disclosure The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a part P using a robotic arm 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; referred to herein simply as "material M" and "material(s)"). In some aspects of the present disclosure the material M includes paint materials, adhesive materials, sealant materials, and the like. The arm 4 moves according to xyz coordinates with respect to rack 5 such that the material applicator 10 moves across a surface (not labeled) of the part P. Also, a power source 6 is configured to supply power to arm 4 and rack 5. The arm 4, rack 5, and the power source 6 are configured to supply material M from the material source 8 to the material applicator 10 such that a coating is produced on the surface of the part P. While FIG. 1 schematically depicts a paint system 2 with one robotic arm 4, it should be understood that paint spray systems 2 with more than one robotic arm 2 are included in the teachings of the present disclosure.

Referring now to FIGS. 2A through 2C, the material applicator 10 according to the teachings of the present disclosure is schematically shown. In one form of the present disclosure, the material applicator 10 includes an array plate 100 with an applicator array 102 comprising a plurality of micro-applicators 110. In some aspects of the present disclosure, the array plate 100 with the applicator array 102 is positioned within a housing 140. Each of the micro-applicators 110 comprises a plurality of apertures 112 through which a material M is ejected such that atomized droplets 3 are formed and propagate generally normal to the array plate 100 as schematically depicted in FIG. 2B. Particularly, each of the micro-applicators 110 has a micro-applicator plate 114 and the plurality of apertures 112 extend through the micro-applicator plate 114. Also, each of the micro-applicators 110 may include a transducer 120, a frame 130 and a material inlet 138. The transducer 120 is in mechanical communication with the micro-applicator plate 114 such that activation of the transducer 120 ultrasonically vibrates the micro-applicator plate 114 as schematically depicted by the horizontal (z-direction) double-headed arrows in FIG. 2B. The frame 130 includes a back wall 134 and at least one sidewall 132 and a reservoir 136 for containing the material M is provided between the back wall 134 and the micro-applicator plate 114. The inlet 138 is in fluid communication with the reservoir 136 and the material source 8 (FIG. 1) such that the material M flows from the material source 8, through inlet 138 and into reservoir 136. The material applicator 10 also includes a UV light source 142 positioned adjacent to the plurality of micro-applicators 110.

In some aspects of the present disclosure, the UV light source 142 is a UV light ring as schematically depicted in FIGS. 2A and 2B. In other aspects of the present disclosure the UV light source 142 is not a UV light ring. For example, the plurality of UV light sources 142 in FIG. 2A can be a plurality of LED UV light sources positioned on the array plate 100 between the plurality of micro-applicators 110, a plurality of LED UV light sources positioned on the micro-applicator plates 114 between the plurality of apertures 112, a UV light ring positioned on the housing 140 or on a perimeter of the array plate 100, and the like.

In operation, material M flows through the inlet 138 into the reservoir 136. Surface tension of material M results in the material M not flowing through the apertures 112 of the micro-applicator plate 114 unless the transducer 120 is activated and vibrates as schematically depicted in FIG. 2B. That is, when transducer 120 is activated and vibrates, material M is ejected through and/or from the plurality of apertures 112 as atomized droplets 3. Also, UV irradiated atomized droplets 3' are formed as the atomized droplets 3 propagate generally normal to the micro-applicator plate 114 and are irradiated with UV light from the UV light source 142. In some aspects of the present disclosure the atomized droplets 3 and UV irradiated droplets 3' have an average droplet diameter between 5 micrometers (μm) and 100 μm, for example between 10 μm and 75 μm, between 10 μm and 50 μm, or between 20 μm and 40 μm.

The material M is a UV curable material and irradiation of the atomized droplets 3 with UV light initiates curing of the material M. For example, the material M may include a UV-activated catalyst (e.g. a photolatent base catalyst) such that UV irradiated atomized droplets 3' deposited onto a surface s' of a substrate S form a UV-cured coating. Non-limiting examples of UV curable materials and UV-activated catalysts include acrylates and epoxies that are initiated by anionic, cationic, photolatent base, and oftentimes, free radical photoinitiators. Urethanes can also be used to create "dual cure" formulations that utilize both a UV and thermal curing step.

In some aspects of the present disclosure, a controller 122 is included (FIG. 2A) and configured to switch the UV light source 142 on and off at desired times. The controller 122 may also be in communication with the material source 8 such that one or more materials $M_n$ is ejected through the plurality of micro-applicators 110. In some aspects of the present disclosure, a cleaning material M is ejected through the plurality of micro-applicators 110 such that material M (e.g., paint material, sealant material, adhesive material, etc.) attached or deposited onto the UV light source 142 is removed.

As schematically depicted in FIG. 2B, the atomized droplets 3 and UV irradiated atomized droplets 3' travel in a direction generally normal to the micro-applicator plate 114 and generally parallel to an axis 1 of the micro-applicator 110. However, it should be understood that the atomized droplets 3 may be diffracted from the plurality of apertures 112 and the stream 5 may be angled relative to the axis 1. It should also be understood that while FIG. 2B schematically depicts material M entering reservoir 136 through inlet 138 and exiting reservoir 136 through apertures 112, other flow configurations of the material M into and out of the reservoir 136 are included in the teachings of the present disclosure.

Referring now to FIG. 3, a method 200 of controlling application of material onto a substrate is illustrated. The method 200 includes flowing a material into an ultrasonic spray nozzle comprising a plurality of micro-applicators at step 202 and ejecting the material from the plurality of micro-applicators at step 204. The ejected material is irradiated with a UV light source positioned adjacent to the plurality of micro-applicators at step 206 such that a plurality of UV irradiated atomized droplets are provided. It should be understood that the plurality of UV irradiated atomized droplets can be deposited onto a surface of a substrate to form a UV cured coating on the substrate.

Referring now to FIG. 4, another method 220 of controlling application of material onto a substrate is illustrated. The method 220 includes ejecting a coating material from an ultrasonic spray nozzle comprising a plurality of micro-applicators at step 222. At step 224, the ejected coating material is irradiated with a plurality of UV light sources positioned adjacent to the plurality of micro-applicators such that curing of the coating material is initiated. A substrate is coated with the irradiated coating material at step 226 and allowed to cure at step 228. In some aspects of the present disclosure, the irradiated coating material is allowed to cure without application of heat 230.

The material applicator 10 may be formed from known materials used in the application of materials onto a surface of an object. For example, the array plate 100, the micro-applicator plate 114, the frame 130 and the housing 140 may be formed from metallic materials, polymer materials, ceramic materials, and/or composites materials. Non-limiting examples of metallic materials include steels, stainless steels, nickel-base alloys, cobalt-base alloys, and the like. Non-limiting examples of polymer materials include \nylon, low-density polyethylene (LDPE), high-density polyethylene (HDPE), polypropylene (PP), polyvinyl chloride (PVC), and the like. Non-limiting examples of ceramic materials include alumina ($Al2O3$), silica ($SiO2$), mullite (e.g., $3Al_2O_3.2SiO_2$), titanium nitride (TiN), and the like. Non-limiting examples of composite materials include fiber reinforced polymers, ceramic matrix composites, metal matrix composites, and the like. The transducer 120 may be formed from piezoelectric materials such as barium titanate ($BaTiO_3$), lead zirconate titanate (PZT), potassium niobite ($KNbO_3$), sodium tungstate ($Na_2WO_3$) and the like. The UV light source may be formed from fluorescent UV light sources, LED UV light sources, and the like. The material M may be a material(s) used to form a coating or layer on a surface of a substrate.

It should be understood from the teachings of the present disclosure that a UV light source is coupled to a micro-applicator for in-situ catalyzing of atomized droplets containing a UV catalyst material (e.g., a photolatent base catalyst). For example, some clearcoats can be cured using a process where a catalyst is activated via UV light. Unlike free radical curing, such UV curable coatings continue to cure after the UV light is removed. In some aspects of the present disclosure, curing of the atomized droplets is delayed and the atomized droplets impact the body surface (substrate) and then start to crosslink and cure without additional UV exposure or heating. In other aspects of the present disclosure, curing of the atomized droplets is not delayed. However, in such aspects the positioning of the micro-applicators relative to the surface of the substrate results in curing of the atomized droplets after being deposited onto the surface without additional UV exposure or heating.

As used herein, the phrase at least one of A, B, and C should be construed to mean a logical (A OR B OR C), using a non-exclusive logical OR, and should not be construed to mean "at least one of A, at least one of B, and at least one of C.

When an element or layer is referred to as being "on," or "coupled to," another element or layer, it may be directly on, connected, or coupled to the other element or layer, or intervening elements or layers may be present. As used herein, the term "and/or" includes any and all combinations of one or more of the associated listed items.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of controlling application of material onto a substrate comprising:
    ejecting at least one material through a material applicator comprising at least one transducer and an array plate with a plurality of micro-applicators, wherein:
        each of the micro-applicators has a material inlet, a reservoir, and a micro-applicator plate in mechanical communication with the at least one transducer, and the micro-applicator plate has a plurality of apertures through which the at least one material is elected as atomized droplets when the transducer vibrates the micro-applicator plate; and
        at least one ultraviolet (UV) light source is positioned adjacent to the plurality of micro-applicators such that the at least one material ejected through the plurality of apertures moves past and is irradiated by the at least one UV light source.

2. The method according to claim 1, wherein each of the micro-applicators has a transducer directly coupled to the micro-applicator plate.

3. The method according to claim 1, wherein the at least one UV light source is a UV light ring.

4. The method according to claim 1, wherein the at least one UV light source is a UV light emitting diode (LED).

5. The method according to claim 1, wherein the at least one UV light source comprises a plurality of UV light rings positioned adjacent to the plurality of micro-applicators such that each UV light ring is positioned adjacent to a micro-applicator and the at least one material ejected from a given micro-applicator is irradiated by the UV light ring positioned adjacent to the given micro-applicator.

6. The method according to claim 1, wherein the at least one UV light source comprises a plurality of UV LEDs positioned adjacent to the plurality of micro-applicators such that each UV LED is positioned adjacent to a micro-applicator and the at least one material ejected from a given micro-applicator is irradiated by the UV LED positioned adjacent to the given micro-applicator.

7. The method according to claim 1, wherein the at least one material is a UV curable coating material.

8. The method according to claim 1, wherein the at least one material is a UV curable coating material comprising a curing catalyst that is activated with UV light.

9. The method according to claim 8, wherein the curing catalyst is a photolatent base catalyst.

10. The method according to claim 9 further comprising curing of the UV curable coating material after the UV curable coating material is applied to the substrate.

11. The method according to claim 10, wherein the UV curable coating material is cured without a heat source.

12. The method according to claim 1 further comprising flowing the at least one material into the reservoir of each of the micro-applicators, wherein the at least one material is a paint and the elected at least one material is atomized droplets of the paint.

13. The method according to claim 1, wherein a surface tension of the at least one material results in the at least one material not flowing through the plurality of apertures unless the transducer is activated and vibrates the micro-applicator plate.

14. The method according to claim 13 further comprising painting a vehicle using the at least one material ejected through the plurality of apertures of each of the plurality of micro-applicators and the least one UV light source.

15. The method according to claim 14, wherein the at least one material is a UV curable clear coat material.

16. A method of controlling application of coating material onto a vehicle comprising:
    flowing paint into an ultrasonic atomization material applicator comprising at least one array with an array plate having a plurality of micro-applicators and a plurality of ultraviolet (UV) light sources positioned adjacent the plurality of micro-applicators, wherein each of the micro-applicators has a material inlet, a reservoir containing the paint, and a micro-applicator plate with a plurality of apertures in mechanical communication with at least one transducer;
    ejecting paint from each of the plurality of micro-applicators by ultrasonically vibrating each of the micro-applicator plates with the at least one transducer such that the paint in each of the reservoirs is elected through each of the plurality of apertures and forms atomized droplets; and
    irradiating the atomized droplets with UV light from the plurality of UV light sources.

17. The method according to claim 16, wherein the plurality of UV light sources comprises a plurality of UV light rings, a plurality of UV light emitting diod